Jan. 13, 1931.　　　A. J. COUGHTRY　　　1,788,824
METHOD OF DETERMINING THE CENTER OF GRAVITY OF SHIPS
Filed Dec. 27, 1929
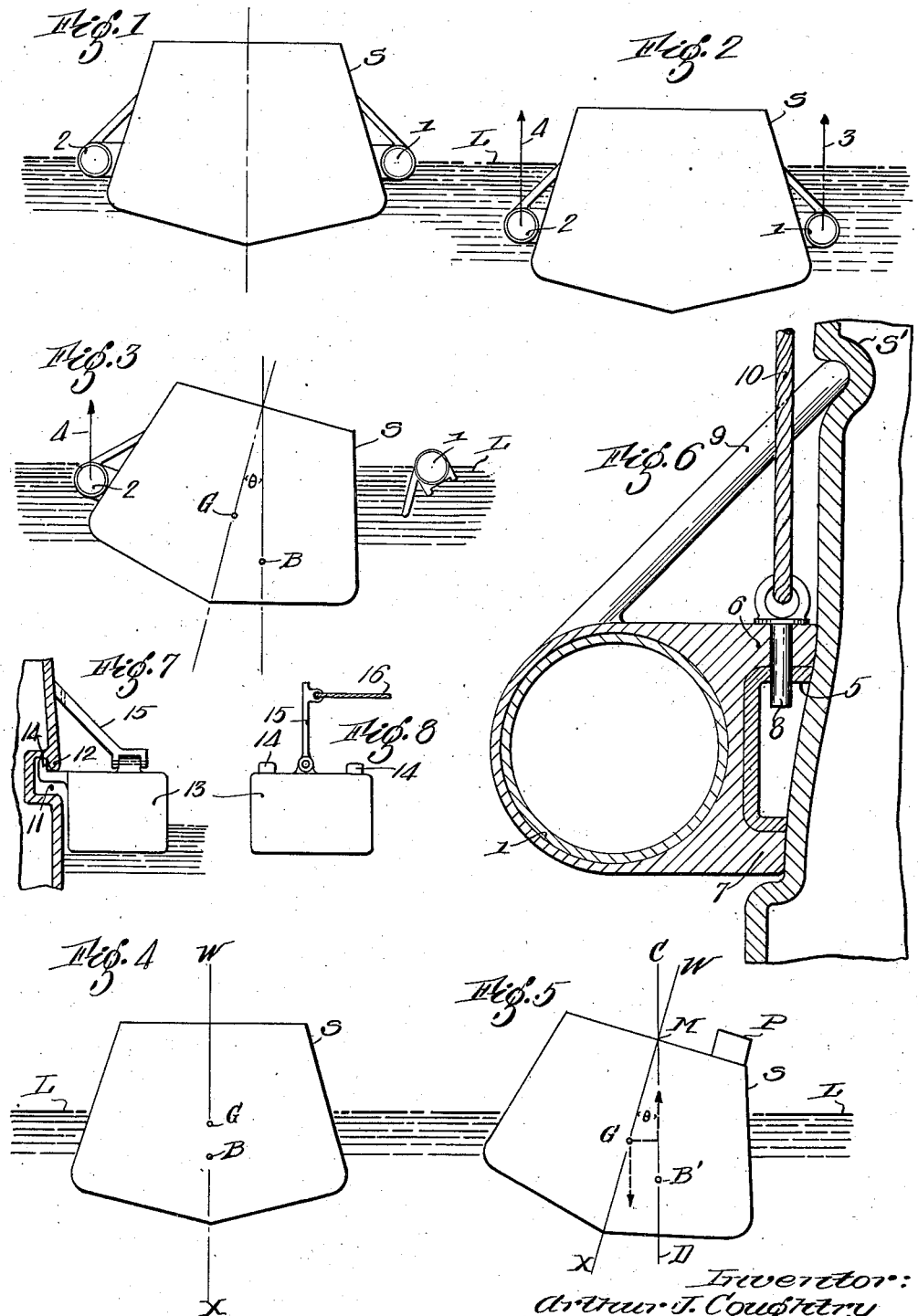

Patented Jan. 13, 1931

1,788,824

UNITED STATES PATENT OFFICE

ARTHUR JACOB COUGHTRY, OF PORTSMOUTH, NEW HAMPSHIRE

METHOD OF DETERMINING THE CENTER OF GRAVITY OF SHIPS

Application filed December 27, 1929. Serial No. 416,926.

This invention pertains to a method or process of determining the center of gravity of a ship and to apparatus useful in the practice of such method or process. In loading a ship it is desirable to keep the center of gravity within a certain range of position in order to insure stability and to prevent capsizing. Heretofore, so far as is known to me, there has been no practical method by which the center of gravity of a loaded ship could be accurately determined without delay just previous to sailing on each voyage, although approximate results have been obtained by locating the center of gravity of the ship when unloaded or light, and guessing at the position thereof after loading. However, this is a mere approximation to the correct result, and involves the initial step of determining the center of gravity of the unloaded ship which is itself, according to usual methods, troublesome, time-consuming, and expensive.

Briefly stated, this old method of determining the center of gravity of a ship, loaded or light, consists in heeling or tipping the ship by means of heavy weights placed at one side and then, by the use of a pendulum or other equivalent device, determining the angle of heel induced by the known weight. Having thus determined the angle of heel, and knowing the weight of the ship, the weight employed in heeling it, and the position of the weight with reference to the central vertical plane of the ship, it is possible to calculate accurately the position of the center of gravity of the loaded or unloaded ship. However, this method of determining the center of gravity is not of practical value as applied to a loaded ship just previous to each sailing or voyage because it is difficult, expensive and time consuming.

In accordance with the present process I am able to determine the center of gravity of the loaded ship, directly with a minimum amount of trouble and expense, and without substantial loss of time, and as respects the loaded ship, the present method provides an accuracy of determination not heretofore known, so that by the adoption of this method the stability or lack of stability of the loaded ship can readily be ascertained before the ship leaves the pier previous to each voyage, thus avoiding danger of capsizing.

In the accompanying drawings I have illustrated diagrammatically one desirable sequence of steps in performing my process, as well as certain structural details useful in the practical application of the process, and in the drawings:

Fig. 1 is a conventional diagrammatic transverse section of a ship unloaded and equipped for the performance of my process;

Fig. 2 is a similar view, but showing the ship fully loaded;

Fig. 3 is a generally similar view, showing the loaded ship tipped to permit determination of the center of gravity according to my method;

Fig. 4 is a diagram illustrating the relation of the center of gravity and center of buoyancy of a floating body;

Fig. 5 is a similar diagram, showing the effects of tipping the floating body;

Fig. 6 is a fragmentary sectional view illustrating one convenient method of attaching the float or pontoon to a ship's side and for releasing it quickly therefrom in the practice of my process;

Fig. 7 is a fragmentary view, to smaller scale than Fig. 6, illustrating another way of attaching the float, the latter being in end elevation; and Fig. 8 is a view of the float of Fig. 7, detached from the ship and in side elevation.

Referring first to Figs. 4 and 5, S represents in outline a ship's hull of conventional type with the water level at L and with the vertical longitudinal central plane of the ship indicated by the line W—X. At some point on this line is found the center of gravity G of the ship's hull, and when the ship is floating on an even keel, the center of buoyancy B lies on the line W—X below the center of gravity.

If the ship be heeled or inclined, as for example by placing a heavy weight P close to one side of the ship's hull, as shown in Fig. 5, the center of gravity G of the ship's hull is unchanged but the center of buoyancy moves relatively thereto, over to some point such as B'. In this position the flotation force acts vertically up through the center of buoyancy B' along the line C—D, and this line makes an angle $\theta$ with the central longitudinal plane W—X. The point at which the line C—D intersects the line W—X is here referred to as the metacenter, and so long as this metacenter is at a substantial distance above the center of gravity, there is always present a turning couple tending to restore the ship to its normal level position. However, if the center of gravity be raised, as for example by placing the cargo too high, it may nearly approach or rise above the metacenter, in which event stability is totally lost and the turning couple involving the weight of the ship and the buoyant force is now such as to capsize the ship.

It is thus evident that the center of gravity should be kept as low as necessary for safety, and in recent years it has been customary for ship builders or owners to have the center of gravity of the ship's hull determined, in order that a proper margin of safety may be preserved after the ship is loaded. Commonly this determination has been made by placing a weight, as shown in Fig. 5, for example from 20 to 100 tons, at one side of the ship, thus causing it to "heel" or incline and then determining the angle $\theta$ from which, by mathematical calculation, the location of the center of gravity could be determined. The manipulation of the very heavy weight necessary for this purpose is troublesome, expensive and time consuming and this method is therefore wholly unsuited to the direct determination of the center of gravity of a loaded ship, before each sailing.

In accordance with the present invention I proceed as illustrated, for example, in Figs. 1, 2 and 3, by first preparing suitable pontoons or floats 1 and 2 each of proper buoyancy or lifting capacity, for example, from 5 to 100 tons. Obviously such pontoons may be made of convenient shape and material and of a size sufficient to exert all of the force necessary for tipping the ship even when loaded. When the ship arrives empty at port, these pontoons are floated against opposite sides of the ship's hull, as for example by a man in a small boat, and secured thereto (sufficiently rigidly to prevent their emerging above the water when the ship is fully loaded) by detachable connections, as hereinafter more fully described. The loading of the cargo now proceeds and as the pontoons are gradually forced deeper and deeper into the water, they exert an increasing lifting effect until, as shown in Fig. 2, when loading is complete, the pontoons 1 and 2 are submerged, beneath the water level, and each exerts an upward lifting force due to its buoyancy acting substantially along the lines 3 and 4, respectively and each of sufficient intensity, if acting alone, to tip or heel the loaded ship.

After the ship is loaded, as shown in Fig. 2, the next step in the process is to release one of the pontoons, for example pontoon 1, as shown in Fig. 3, so that it no longer supports its side of the ship, although the other pontoon still continues to exert its upward force. This force, indicated by the line 4, Fig. 3, being unbalanced, tips the ship so that the angle can readily be determined by usual methods; and since the point of application of the pontoon is known, and since its lifting effect can readily be calculated from its dimensions, the position of the center of gravity G of the ship can easily be calculated upon the basis of these and the other known factors. As soon as the angle $\theta$ has been determined, the pontoon 2 is released, and the ship immediately resumes its normal position, and may proceed at once upon its voyage.

It will be noted that this method does not interfere with the loading of the ship, and after loading is complete, no substantial time is consumed in tipping the ship, since the pontoon at one side may be released almost instantaneously, whereupon the ship immediately assumes its tipped position ready for the angle reading.

In Fig. 6 I have illustrated one mode of attaching the pontoons or floats to the ship, wherein the ship's hull S' is provided with a depression or cavity in its side which receives the fixed bracket member 5. The pontoon is provided with projecting arms 6 and 7 spaced to admit the bracket 5 between them, the upper arm 6 and the upper wall of the bracket 5 being provided with aligned openings for the reception of the retaining bolt 8. Each pontoon is likewise preferably provided with one or more brace arms 9, the free end of the brace arm being adapted to engage within a socket or against a suitable bracket on the ship's side. A releasing cable 10 is secured to the bolt 8 and extends up above the water level.

In applying the pontoon shown in Fig. 6, it is floated against the ship's side and the arms 6 and 7 are caused to receive the bracket 5 between them. The bolt 8 is then inserted and this bolt, in combination with the brace arm 9 and the arm 7, holds the pontoon in place during loading of the ship. When the ship is loaded to the desired degree, the cable 10 of one of the pontoons is pulled to release the bolt 6, whereupon the pontoon will separate from the ship's side, allowing the opposite pontoon to tip the ship as above described.

In Figs. 7 and 8 I have illustrated another way of detachably securing the pontoon in place. In Fig. 7, I have shown a section of the ship's plating, having a cavity 11 provided with an overhanging lip 12. The pontoon 13 has a pair of hooks 14 adapted to enter the cavity and engage the lip 12, and a brace 15 is pivotally secured to the top of the pontoon to swing about a transverse axis. The upper part of the brace has an eye for attaching the end of the release rope 16. When the pontoon is floated against the ship's side with its hooks entering cavity 11, the brace is raised to the position of Fig. 7, but when it is desired to release the pontoon, the brace is pulled over sidewise until it no longer prevents upward movement of the pontoon.

As compared with the old process which makes use of heavy extraneous weights in obtaining the energy for heeling the ship, my new process requires the application of no substanial force other than that developed in loading the ship, so that the expense involved in the operation is almost negligible.

While I have hereinabove specifically described the use of two floats or pontoons, the process in its broader aspects may be carried out with the aid of a single pontoon which is attached to the unloaded ship, and which gradually tips the ship during the loading of the latter. When the ship is loaded, the angle of the tip may be noted for use in calculating the center of gravity, and as soon as the angle has been determined the pontoon may be released, thereby immediately restoring the ship to an even keel. This modification of the process may be of utility where inadequate dockage accommodations make it difficult or impossible to employ a pontoon at each side of the ship. Moreover, I contemplate that if conditions prevent attachment of the pontoon before loading begins, the process may be carried out by attaching one or two filled or partially filled pontoons and then during loading, pumping out one or both pontoons so that when loading is complete the ship is or may be tipped in the same way as above described but without loss of time after loading is complete.

While I have here illustrated certain desirable forms of pontoon and attaching means therefor which would be useful in performing my improved process, I wish it to be understood that the invention is not limited to these particular details of construction but that any equivalent means may be employed for the purpose whereby the desired tipping force may be caused to act quickly and expeditiously.

I claim:

1. That method of determining the center of gravity of a ship which comprises as steps causing balanced lifting forces of known value to act upon a ship at predetermined points at its opposite sides during loading, increasing said forces progressively as the loading proceeds until either force acting alone is sufficient to tip the loaded ship to a desired angle, suddenly causing one of said forces to cease acting, whereby the loaded ship is tipped in response to the continued action of the other force, and noting the resultant angle of tip as a basis for calculating the position of the center of gravity.

2. That method of determining the center of gravity of a ship which comprises as steps causing a lifting pontoon at each side of the ship to exert a force tending to tip the ship, the lifting force being of substantially equal and known value and acting at predetermined points at opposite sides respectively of the longitudinal center line of the ship, suddenly releasing one of said pontoons whereby to permit the other to tip the ship, and observing the angle of tip as a basis for calculating the center of gravity of the loaded ship.

3. That method of determining the position of the center of gravity of a ship which comprises as steps attaching to each side of the unloaded ship a lifting pontoon, loading the ship and thereby submerging the pontoons, whereby to create lifting forces due to the buoyancy of the submerged pontoons at each side of the center line of the ship, and when the ship has been loaded to a predetermined extent suddenly releasing one of said pontoons so that the lifting force of the other pontoon causes the ship to tip, and noting the angle of tip as a basis for calculating the center of gravity of the loaded ship.

Signed by me at Portsmouth, N. H., this twenty-fourth day of December, 1929.

ARTHUR JACOB COUGHTRY.